US008296200B2

(12) United States Patent
Mangipudi et al.

(10) Patent No.: US 8,296,200 B2
(45) Date of Patent: Oct. 23, 2012

(54) COLLABORATIVE FINANCIAL CLOSE PORTAL

(75) Inventors: Keshava Mangipudi, Pleasanton, CA (US); Amira Morcos, San Ramon, CA (US); Jeremias Romana, Martinez, CA (US); Bhupinder Sondhi, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 471 days.

(21) Appl. No.: 12/470,419

(22) Filed: May 21, 2009

(65) Prior Publication Data

US 2010/0299176 A1  Nov. 25, 2010

(51) Int. Cl.
*G06Q 40/00* (2012.01)
*G06F 3/00* (2006.01)
*G06F 3/048* (2006.01)
*G06F 15/16* (2006.01)

(52) U.S. Cl. ............. 705/30; 705/35; 705/36 R; 705/37; 709/205; 715/742; 715/764

(58) Field of Classification Search ........................ None
See application file for complete search history.

(56) References Cited

U.S. PATENT DOCUMENTS

| | | | | | |
|---|---|---|---|---|---|
| 5,008,853 | A | * | 4/1991 | Bly et al. ....................... | 715/751 |
| 5,220,657 | A | * | 6/1993 | Bly et al. ....................... | 711/152 |
| 5,388,196 | A | * | 2/1995 | Pajak et al. .................... | 715/751 |
| 6,405,195 | B1 | * | 6/2002 | Ahlberg ......................... | 709/219 |
| 6,957,199 | B1 | * | 10/2005 | Fisher ............................ | 705/78 |
| 7,050,997 | B1 | | 5/2006 | Wood, Jr. | |
| 7,353,232 | B1 | * | 4/2008 | Kalucha et al. ................ | 705/64 |
| 7,653,688 | B2 | * | 1/2010 | Bittner .......................... | 709/204 |
| 7,962,750 | B1 | * | 6/2011 | Gruse et al. .................... | 713/171 |
| 2002/0065885 | A1 | * | 5/2002 | Buonanno et al. ............ | 709/205 |
| 2002/0120538 | A1 | * | 8/2002 | Corrie et al. ................... | 705/35 |
| 2003/0004982 | A1 | * | 1/2003 | Brandon et al. ............... | 707/500 |
| 2003/0065527 | A1 | * | 4/2003 | Yeh et al. ....................... | 705/1 |
| 2003/0078821 | A1 | * | 4/2003 | Gorur et al. .................... | 705/7 |
| 2004/0174392 | A1 | * | 9/2004 | Bjoernsen et al. ............ | 345/751 |

(Continued)

FOREIGN PATENT DOCUMENTS

GB    2432238 A    5/2007

OTHER PUBLICATIONS

The Financial Close Optimizing Performance and Driving Financial Excellence; 2009; 20-pages.*

(Continued)

*Primary Examiner* — Gregory Johnson
(74) *Attorney, Agent, or Firm* — Silicon Valley Patent Group LLP; Omkar Suryadevara

(57) ABSTRACT

Mechanisms and approaches for a collaborative financial close portal are provided. A client receives display data, which when rendered by the client, depicts a collaborative financial close portal that supports one or more workspaces. Each of the one or more workspaces may be used by a different set of users to perform activities related to a financial close process. The one or more workspaces are arranged in a hierarchical relationship. In response to receiving identification data that identifies a user of the client, additional display data is sent to the client, which when rendered, depicts a particular workspace for which the user is granted access. The depiction of the particular workspace includes depicting status information about financial close activities associated with one or more workspaces lower in the hierarchal relationship than the particular workspace.

21 Claims, 11 Drawing Sheets

U.S. PATENT DOCUMENTS

| | | | |
|---|---|---|---|
| 2005/0027574 A1* | 2/2005 | Agrawal et al. | 705/7 |
| 2005/0055306 A1* | 3/2005 | Miller et al. | 705/37 |
| 2006/0010125 A1* | 1/2006 | Beartusk et al. | 707/4 |
| 2006/0044307 A1* | 3/2006 | Song | 345/419 |
| 2006/0085245 A1* | 4/2006 | Takatsuka et al. | 705/9 |
| 2006/0277089 A1* | 12/2006 | Hubbard et al. | 705/9 |
| 2007/0055596 A1* | 3/2007 | Yankovich et al. | 705/35 |
| 2007/0094064 A1* | 4/2007 | Yankovich et al. | 705/8 |
| 2007/0143169 A1* | 6/2007 | Grant et al. | 705/9 |
| 2007/0150299 A1* | 6/2007 | Flory | 705/1 |
| 2007/0240063 A1* | 10/2007 | Cheng et al. | 715/741 |
| 2007/0250492 A1* | 10/2007 | Angel et al. | 707/4 |
| 2007/0282657 A1* | 12/2007 | Hupfer et al. | 705/9 |
| 2007/0282659 A1* | 12/2007 | Bailey et al. | 705/9 |
| 2007/0288253 A1* | 12/2007 | Cobb et al. | 705/1 |
| 2008/0033997 A1* | 2/2008 | Banker | 707/104.1 |
| 2008/0077530 A1* | 3/2008 | Banas et al. | 705/50 |
| 2008/0228671 A1 | 9/2008 | Nagaraj | |
| 2008/0294723 A1* | 11/2008 | Daniels et al. | 709/205 |
| 2009/0083726 A1* | 3/2009 | Amend et al. | 717/171 |
| 2009/0113310 A1* | 4/2009 | Appleyard et al. | 715/742 |
| 2009/0222742 A1* | 9/2009 | Pelton et al. | 715/753 |
| 2009/0254406 A1* | 10/2009 | Sichart et al. | 705/9 |
| 2009/0276715 A1* | 11/2009 | Arbogast et al. | 715/736 |
| 2009/0292580 A1* | 11/2009 | Cross et al. | 705/9 |
| 2009/0313562 A1* | 12/2009 | Appleyard et al. | 715/764 |
| 2010/0043065 A1* | 2/2010 | Bray et al. | 726/8 |
| 2010/0076797 A1* | 3/2010 | Doerfler et al. | 705/7 |
| 2010/0106546 A1* | 4/2010 | Sproule | 705/7 |
| 2010/0198651 A1* | 8/2010 | Johnson et al. | 705/9 |
| 2011/0047611 A1* | 2/2011 | Hayler et al. | 726/12 |
| 2011/0161419 A1* | 6/2011 | Chunilal | 709/204 |

OTHER PUBLICATIONS

Automating The Financial Close; 2009; 19-pages.*

Web document discussing Microsoft Office Sharepoint Server, entitled "Collaboration Features," available at www.microsoft.com/sharepoint/capabilities/collaboration/features.mspx, printed Jan. 28, 2009, 3 pages.

Web document discussing Oracle Hyperion Financial Management, entitled "JD Edwards EnterpriseOne Financial Management," available at www.oracle.com/applications/peoplesoft/financial_mgmt/ent_one/index.html, printed Jan. 28, 2009, 1 page.

Web document entitled "CODA Collaborative Close," available at www.coda.com, printed Jan. 28, 2009, 8 pages.

Jenny Ong Szy Hui, Achieving Financial Excellence with SAP ERP Financials, Web document available at www.sap.com/malaysia/company/events/summit08/Assets%5CPresentation%20PDF%5 CDay%201%5C Executive%-20 View %20 Tracks%5CFinancial%20Excellence%5CJenny%20-Ong%5CAchieving%20Financial%20Excellence%20with%20SAP%20ERP%20Financials.PDF, dated Jul. 9, 2008, printed Jan. 28, 2009. 29 pages.

Web document, Wikipedia online encyclopedia entry on Microsoft SharePoint, available at en.wikipedia.org/wiki/Sharepoint, printed Jan. 28, 2009, 4 pages.

Web document discussing Microsoft Office SharePoint Server, entitled Collaboration and Social Computing, available at www.microsoft.com/sharepoint/capabilities/collaboration/overview.html, printed Jan. 28, 2009, 4 pages.

Web document entitled "The People-Ready Business Case Study," available at http://images.forbes.com/media/modules/bizvisionaries/Microsoft_FinClose_PeopleReady.pdf, printed Jan. 28, 2009, 4 pages.

Web document discussing Oracle Governance, Risk, and Compliance Controls Suite, entitled "information Governs," avaiiable at http:/www.oracle.com/solutions/corporate_governance/oracie-financial-governance-solution-brief.pdf, printed Jan. 28, 2009, 2 pages.

* cited by examiner

400

COLLABORATIVE FINANCIAL CLOSE PORTAL

FIELD OF THE INVENTION

The present invention relates to a collaborative portal which may be used to facilitate the performance of a financial close.

BACKGROUND OF THE INVENTION

When any commercial organization reaches the end of its accounting period, the organization must "close its books." This process is referred to as a financial close. In performing a financial close, an organization must close and reconcile its financial records for a particular accounting period, create various financial statements, and report the financial statements and related data to various parties. For example, a public company is required to report financial statements to the U.S. Securities and Exchange Commission (SEC), the upper management of the company, and to their investors, while a private company is required to report financial statements to their state of incorporation and to their upper management.

At a minimum, a commercial organization must perform a financial close annually, because the commercial organization needs to file an income tax return every year. Some organizations may also choose to perform a financial close more often, such as quarterly, monthly, or even daily, although the latter is not common.

When performing a financial close, it is necessary to ensure all financial data is accurately recorded in the organization's general ledger. However, such data may reside in a variety of different systems in a variety of different locations. The data may also be stored electronically in various formats or may be manually recorded. As a result, performing a financial close typically involves hundreds of activities and collaboration across multiple business units and large geographical regions and different time zones.

The large number of financial documents, reports, and schedules (both audited and unaudited) involved in a financial close undergo many revisions and stages of approval before being finalized. Such financial documents, reports, and schedules are subject to numerous requirements, such as SEC rulings, Sarbanes/Oxley Compliance, and audit requirements. Consequently, it is important for such documents, reports, and schedules to be accurate and complete.

Currently, the performance of a typical financial close is coordinated through numerous emails, phone calls, spreadsheets, and documents. As a result, the financial close process is error-prone, tedious, and time-consuming. However, despite these hardships, earnings report must go out by certain date, as there are penalties for missing a deadline.

SUMMARY OF THE INVENTION

Techniques are provided for a collaborative portal which may be used to facilitate the process of performing a financial close. The collaborative portal may be accessed anytime by a variety of different clients. The collaborative portal may support one or more workspaces. A workspace is a shared content area to which any number of users may be granted access for purposes of performing activities related to a particular financial close process. In this way, all activities pertaining to a financial close may be facilitated, monitored, and managed by the collaborative portal.

By using the collaborative portal to perform a financial close, users may collaborate with other users, manage and control critical tasks and compliance issues, share documents and maintain version and approval information about the documents, and conduct managed communications. Thus, the process of performing a financial close is vastly simplified, thereby increasing the speed and ease of performing a financial close. Additionally, by performing all financial close activities using the collaborative portal, an organization may be assured that its best practices and policies are being followed as well as all relevant documents, data, and communications are appropriately archived.

In an embodiment, the plurality of workspaces that are supported by the collaborative portal are arranged in a hierarchical relationship that corresponds to the hierarchical structure of business units of an organization which are performing a financial close. To illustrate, if the plurality of workspaces supported by a collaborative portal are arranged in a tree, then the workspace associated with the root node of the tree may correspond to the entire company as a whole, and the workspaces associated with the child nodes of the root node may correspond with different departments of the company, as so on. Such an approach is helpful because it helps facilitate the financial close of each organizational level of an organization simultaneously as well as provides the ability for a user to drill down from one workspace to another to obtain additional details about activities associated with that workspace.

In an embodiment, each workspace may be associated with one or more pagelets. A pagelet is pluggable user interface component that assists in the performance of activities related to the financial close process. A user may add or remove pagelets to his view of his workspace as well as configure the operation of each pagelet. In this way, by using the pagelets associated with a workspace, when a user accesses a workspace to which he or she has been granted access, the user may quickly ascertain the status of his action items, view relevant information, and perform activities and tasks to which the user is responsible.

The above discussion is merely illustrative of certain embodiments, and is not intended to enumerate or describe all the embodiments of the inventions that are described in further detail below.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

A method and apparatus for a collaborative financial close portal is described. In the following description, for the purposes of explanation, numerous specific details are set forth in order to provide a thorough understanding of embodiments of the invention. It will be apparent, however, that embodiments of the invention may be practiced without these specific details. In other instances, well-known structures and devices are shown in block diagram form in order to avoid unnecessarily obscuring the embodiments of the invention discussed herein.

Architecture Overview

Figure 1:
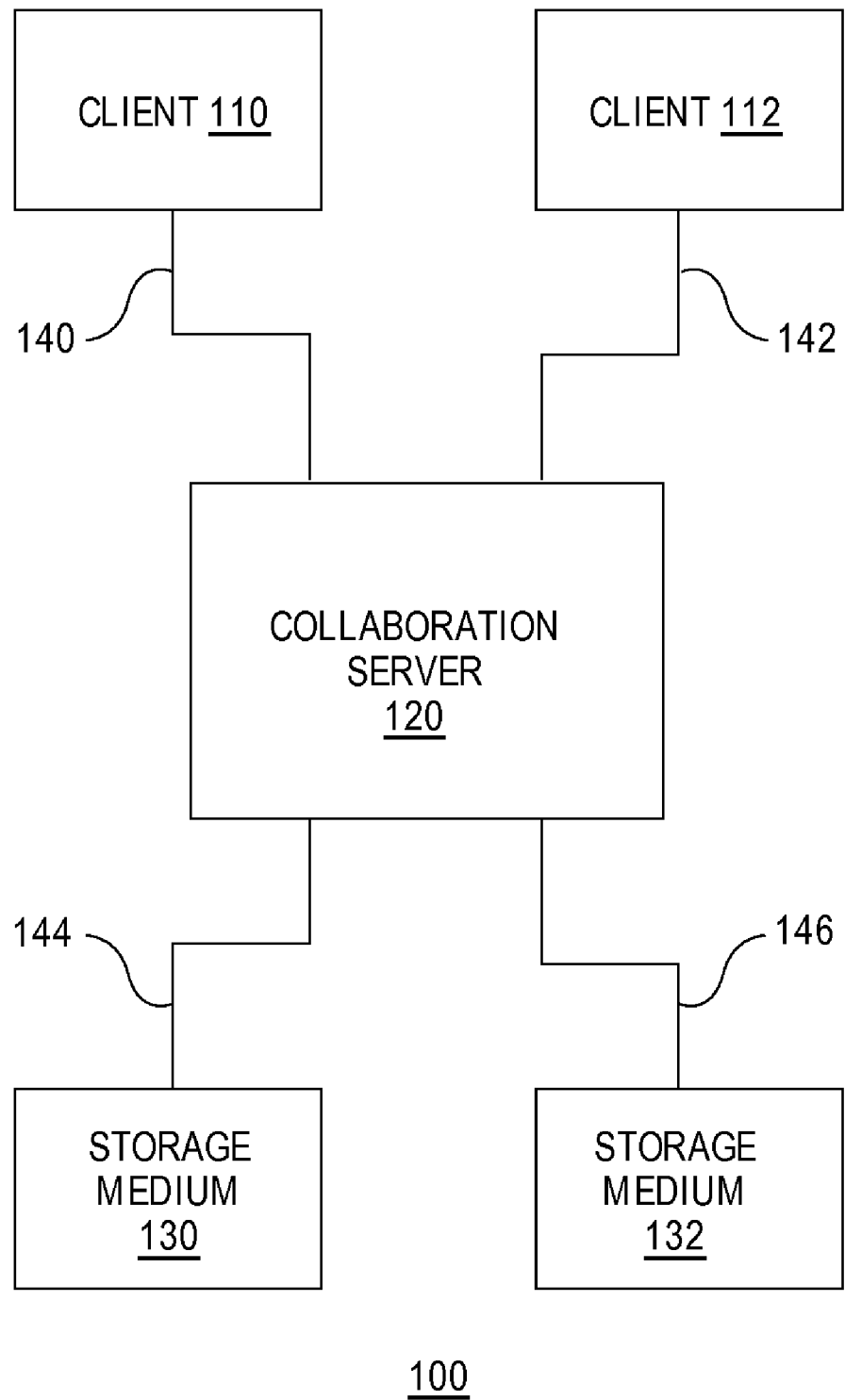
FIG. 1 is a block diagram of an illustrative system according to an embodiment of the invention.

FIG. 1 is a block diagram of an illustrative system 100 according to an embodiment of the invention. System 100, or a portion thereof, may be referred to as a collaborative financial close portal. System 100 may be used by a plurality of users to collaboratively perform a financial close according to embodiments of the invention. In an embodiment, system 100 comprises client 110, client 112, collaboration server 120, storage medium 130, storage medium 132, and communications links 140, 142, 144, and 146.

Clients 110 and 112 each represent any mechanism capable of (a) displaying digital data to a user and (b) communicating with collaboration server 120. A user uses a client to interact with collaboration server 120 in the performance of activities and tasks related to a financial close. Non-limiting, illustrative examples of clients 110 and 112 include a web browser, a software application, a cell phone, a personal digital assistance (PDA), a wireless device, and a personal computer.

A client may display a user interface to a user to facilitate the user's interaction with the client. For example, if client 110 is implemented using a web browser, then client 110 may depict digital data on a web page (in other words, the user interface) through which a user may interact with client 110. As another example, if client 110 is implemented using a cell phone, then client 110 may depict digital data on a physical display of the cell phone through which the user may interact with client 110. Note that while only two clients are depicted in FIG. 1 for ease of explanation, embodiments of the invention may include any number of clients. Indeed, in some embodiments, a user of system 100 may, but need not, employ more than one client, e.g., a user may use a personal computer, a cell phone, and a personal digital assistant (PDA) to communicate with collaboration server 120.

In an embodiment, collaboration server 120 represents any computerized entity, such as one or more software components, capable of interacting with a client (such as client 110 and 112) and with a storage medium (such as storage medium 130 and 132). In an embodiment, collaboration server 120 is responsible for servicing requests from clients and storing data to and retrieving data from a storage medium. The functions performed by collaboration server 120 that enable a user of a client to perform activities and tasks related to a financial close shall be explained in further detail below.

While collaboration server 120 is depicted in FIG. 1 as a single entity, in some embodiments, collaboration server 120 may be implemented as two or more entities. For example, in an embodiment, collaboration server 120 may be implemented using a web server and an application server. As another example, collaboration server 120 may be implemented using redundant components or as a server cluster for scalability, fault tolerance, or performance related reasons. In certain embodiments of the invention, collaboration server 120 may be implemented using the Enterprise Collaboration Workspace product, to be available from Oracle Corporation of Redwood Shores, Calif.

Storage mediums 130 and 132 each represent any medium for persistently storing digital data. Non-limiting, illustrative examples of storage medium 130 include a file server and a database management system (DBMS). In the embodiment, storage medium 130 or 132 may be implemented using a DBMS that comprises a database server and a database. In an embodiment, the data stored in storage medium 130 may represent any number of physical and tangible objects, e.g., data stored in storage medium 130 may represent financial data about an organization, a business, or data about any real-world activity. While storage mediums 130 and 132 are depicted as single entities, each may be implemented as one or more separate entities to promote scalability and ensure operability, e.g., storage medium 130 may be implemented using a parallel server, server cluster, or data stored therein may periodically be backed up to a separate storage device.

Communications link 140 may be implemented by any medium or mechanism that provides for the exchange of data between client 110 and collaboration server 120. Communications link 142 may be implemented by any medium or mechanism that provides for the exchange of data between client 112 and collaboration server 120. Communications link 144 may be implemented by any medium or mechanism that provides for the exchange of data between collaboration server 120 and storage medium 130. Communications link 146 may be implemented by any medium or mechanism that provides for the exchange of data between collaboration server 120 and storage medium 132. Non-limiting, illustrative examples of communications links 140, 142, 144, and 146 include, without limitation, a network such as a Local Area Network (LAN), Wide Area Network (WAN), Ethernet or the Internet, one or more terrestrial, satellite or wireless links, and serial or parallel printer cables.

FIG. 1 is not intended to depict all embodiments of the invention, as some embodiments of the invention may differ in their implementation than system 100 depicted in FIG. 1. Having explained an illustrative system 100 according to an embodiment of the invention, the user interface presented by clients according to certain embodiments of the invention shall now be discussed in additional detail.

Using the Collaborative Financial Close Portal

Figure 10:
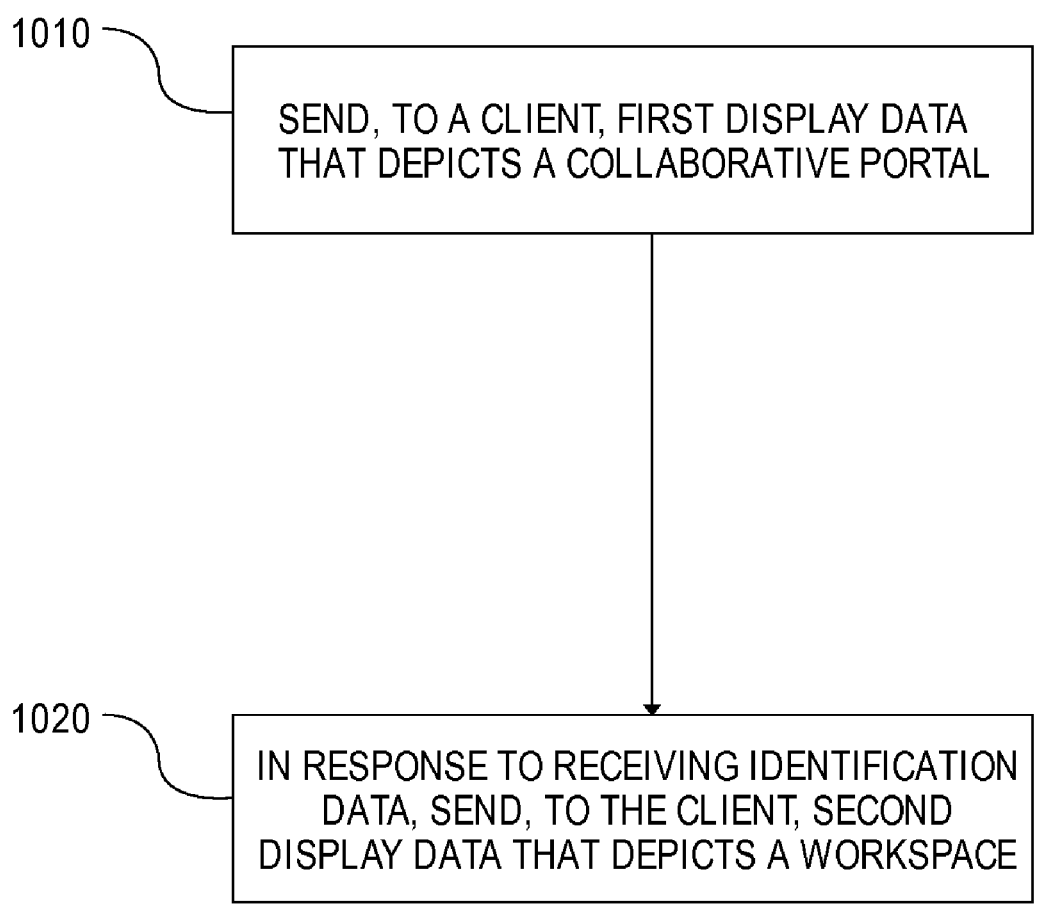
FIG. 10 is a flowchart illustrating the functional steps performed by a collaboration server according to an embodiment of the invention.

FIG. 10 is a flowchart illustrating the functional steps performed by a collaboration server according to an embodiment of the invention. In step 1010, display data (denoted "first display data" for clarity) is sent from collaboration server 120 to client 110 (or any client). When client 110 receives the first display data, client 110 renders the first display data to depict a collaborative financial close portal on a display of client 110. The collaborative financial close portal, as shall be explained in more detail below, supports one or more workspaces. A user may interact with the workspace by viewing one or more user interfaces. As shall be explained in more detail in the next section, a user interface may include a pagelet which enables the user to perform functions related to the financial close process.

Initially, the user may log onto system 100 by presenting identification data that identifies the user to collaboration server 120. After collaboration server 120 receives the identification data, step 1020 may be performed. In step 1020, display data (denoted "second display data" for clarity) may be sent from collaboration server 120 to client 110. The second display data, when rendered by client 110, depicts a particular workspace to which the user has been granted access. The particular workspace may be depicted by displaying a user interface (which may, but need not include a pagelet) that depicts status information about the financial close process associated with the workspace. The particular workspace may include controls which, when configured by the user, enable the user to submit requests, pertaining to the performance of a financial close process, to collaboration server 120.

In this manner, client 110 may issue requests to collaboration server 120. Collaboration server 120 may respond to those requests by processing the requests, retrieving any needed data for a storage medium, and sending a response to client 110. The response may include display data, which when rendered by client 110, depicts an additional or updated user interface associated with the response. Having provided a high level description of how client 110 may interact with the collaboration server 120, additional details about the operation of user interfaces and workspaces according to embodiments of the invention will now be discussed.

User Interfaces and Workspaces

Figure 2:
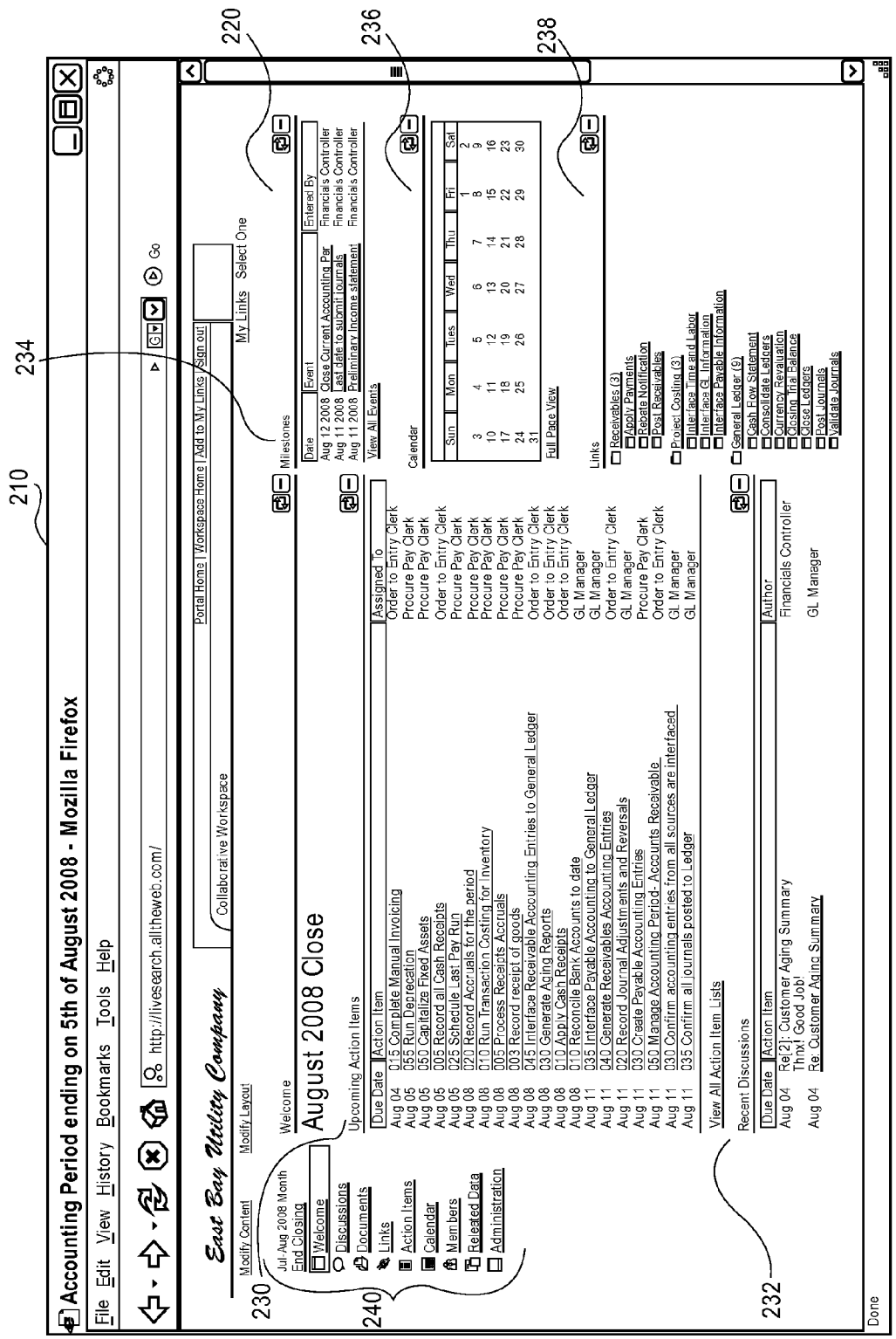
FIG. 2 is an illustration of a user interface displayed by a client according to an embodiment of the invention.

FIG. 2 is an illustration 200 of a user interface displayed by a client according to an embodiment of the invention. Illustration 200 depicts a client 210 that is implemented using a web browser. Client 210 displays a user interface 220 that is implemented as a web page. User interface 220 displays, to a user of client 210, data pertaining to a financial close process. For example, user interface 220 displays upcoming action items, recent discussions, upcoming milestones, a calendar of events, and related links, all of which are associated with a particular financial close process. As shall be explained in more detail below, a user of client 210 may use to user interface 220 view information about and perform activities and tasks related to a financial close process.

Data pertaining to a financial close process may be associated with one or more workspaces. A workspace is a shared content area that is associated with a particular financial close process. For example, a workspace may be associated with a particular organization's financial close process. A workspace may be used by a set of users having access to the workspace to perform activities related to the particular financial close process associated with the workspace. A user that has access to a particular workspace may tailor his or her view of the workspace. Thus, as shall be explained in more detail below, while users who have been granted access to a particular workspace may have access to the same data, each user may tailor or configure how each he or she views or interacts with the data.

A workspace is intended to capture and record all data associated with a particular financial close process. Since a financial close process may cover different periods of time (for example, you could close your books each day, each month, every quarter, or just every year), a workspace may also be associated with different periods of time.

Some businesses initially perform a financial close process on lower level units or logical groups of the business, and subsequently perform one or more additional financial close processes on higher level units or logical groups of the business. To address this behavior, in an embodiment, a workspace is established for each unit or logical group of an organization that is to undergo a financial close process. For example, if each department of a company typically undergoes a financial close process before the company as a whole undergoes a financial close process, then a separate workspace may be established for each department as well as the company as a whole. As another example, if a transnational corporation conducts operations in multiple countries, and the corporation's business units in each country undergo a financial close process, then a separate workspace may be established for the corporation's business unit associated with each country as well as for the company as a whole.

In an embodiment, system 100 may employ a plurality of workspaces that are arranged in a hierarchy, such as a tree. In such an embodiment, the hierarchy of workspaces may correspond to a hierarchy of business units or organizational levels of an organization which undergo a financial close process. Status information about activities pertaining to particular workspace may be made available to one or more workspaces that are higher in the hierarchy of workspaces. In this way, a person in the high level management of the organization may manage and monitor activities associated with the financial close processes occurring at the lower levels of the organization.

Clients, such as client 210 depicted in FIG. 2, will typically display a user interface showing data associated with only one workspace at a time because if data from multiple workspaces was presented to the user in a single user interface at the same time, the viewer may become confused or use of the user interface may become too cumbersome. However, some embodiments of the invention may employ clients that are capable of clearly and efficiently presenting data from different logical groupings while clearly identifying to which logical group a set of data belongs, such as using a split screen or by using tabs to enable the user to quickly tab back and forth between workspaces. Thus, some embodiments may employ clients capable of display data from multiples workspaces simultaneously, as long as the user interface of the client clearly identifies, to the user, which workspace is associated with the displayed data.

A user may create and define a particular workspace by supplying information about the characteristics of the workspace to collaboration server 120. For example, the user may configure which users should be invited to join the workspace or which financial close process should be associated with the workspace. In an embodiment, a user may create a workspace by using a template that identifies a set of default configuration information for the workspace. In this way, the process of creating a workspace may be simplified and streamlined, since many of the characteristics of a workspace may not change from one financial close process to another.

Figure 4:
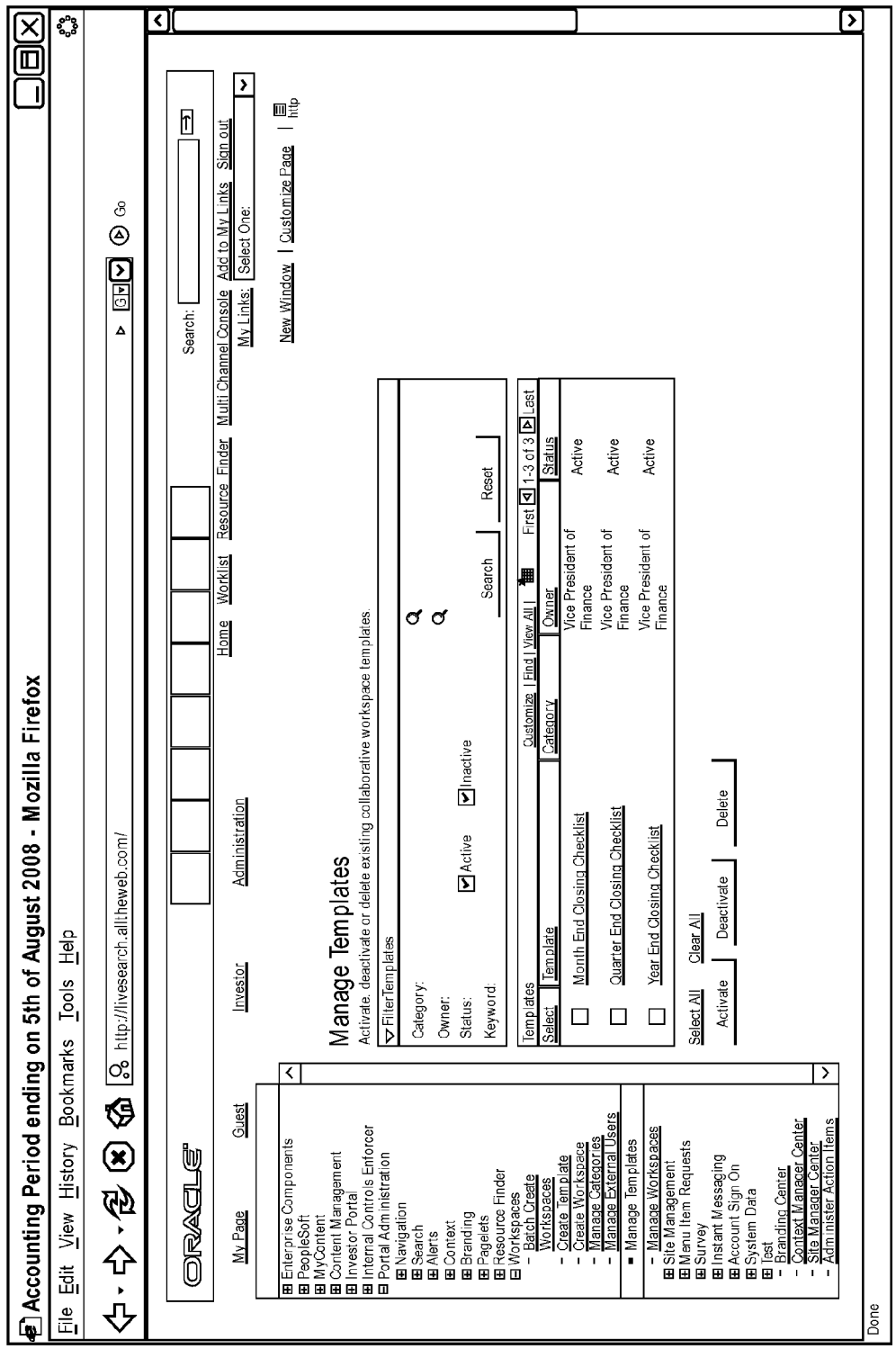
FIG. 4 is an illustration of a user interface which may be used to create a new workspace based on a template for a workspace according to an embodiment of the invention.

FIG. 4 is an illustration of a user interface 400 which may be used to create a new workspace based on a template for a workspace according to an embodiment of the invention. User interface 400 may be used to search for a particular template based on a variety of search criteria. When a user submit a request to create a new workspace to collaboration server 120 through user interface 400, collaboration server 120 creates the new workspace to have the attributes of a template identified by the request. After the new workspace is created, the user may subsequently modify the properties to suit the user's wishes, and may thereafter save the configured workspace as a new template if the user so desires.

In an embodiment, once the financial close process associated with a particular workspace has been completed, all data associated with the workspace is stored in a persistent digital storage medium, such as storage medium 130 or 132. For example, any email, documents (including all versions of documents), instant message communications, and any information about when a user approves a particular version of document may be stored in associated with the workspace. Even phone calls and voice mails may be stored in association with a workspace. In this way, all information about a financial close process may be accessed and viewed after the financial close process has been performed. Accessing information about a prior financial close process may be helpful to answer questions and to determine how the financial close process was previously performed.

Figure 5:
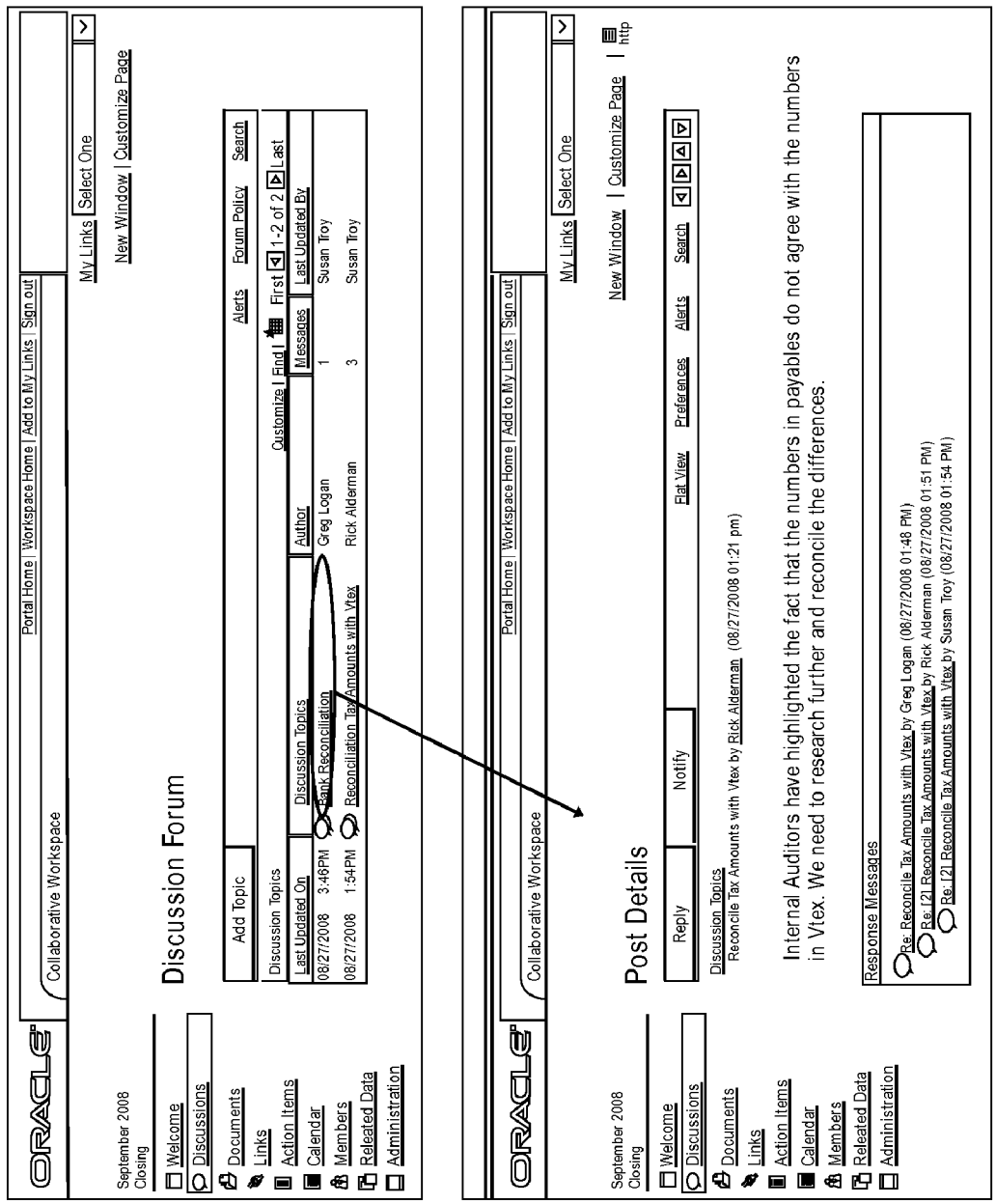
FIG. 5 is an illustration of a user interface depicting conversation details of a discussion forum according to an embodiment of the invention.

In this way, system 100 acts as a repository for all communications and decisions related to the financial close process. To illustrate, consider FIG. 5, which is an illustration of a user interface depicting conversation details of a discussion forum according to an embodiment of the invention. As shown in FIG. 5, user interface 500 enables a user to create separate discussion topics and initiate or respond to discussion. All data pertaining to these discussions will be saved with the workspace. Additionally, while not depicted in FIG. 5, certain user interfaces may enable a user to conduct other types of conversation, such as a phone call or an instant message. These other types of conversations, such as a phone call and instant messages, may be digitally recorded and stored with the associated workspace.

In particular, it is advantageous and desirable to store and maintain information relating to the approval of documents. In an embodiment, collaboration server 120 stores, in a persistent storage medium, approval data that identifies, for each document associated with the particular workspace that has been signed, (a) the identify of any user which signed the document, (b) the version of the document signed, and (c) the date each user signed the document. The approval data is maintained in the persistent storage medium after the conclusion of the financial close process. In this way, if a user wishes to verify certain data or identify how a certain action was taken after the performance of a financial close process, this information may be accessed by a user of system 100.

Figure 6:
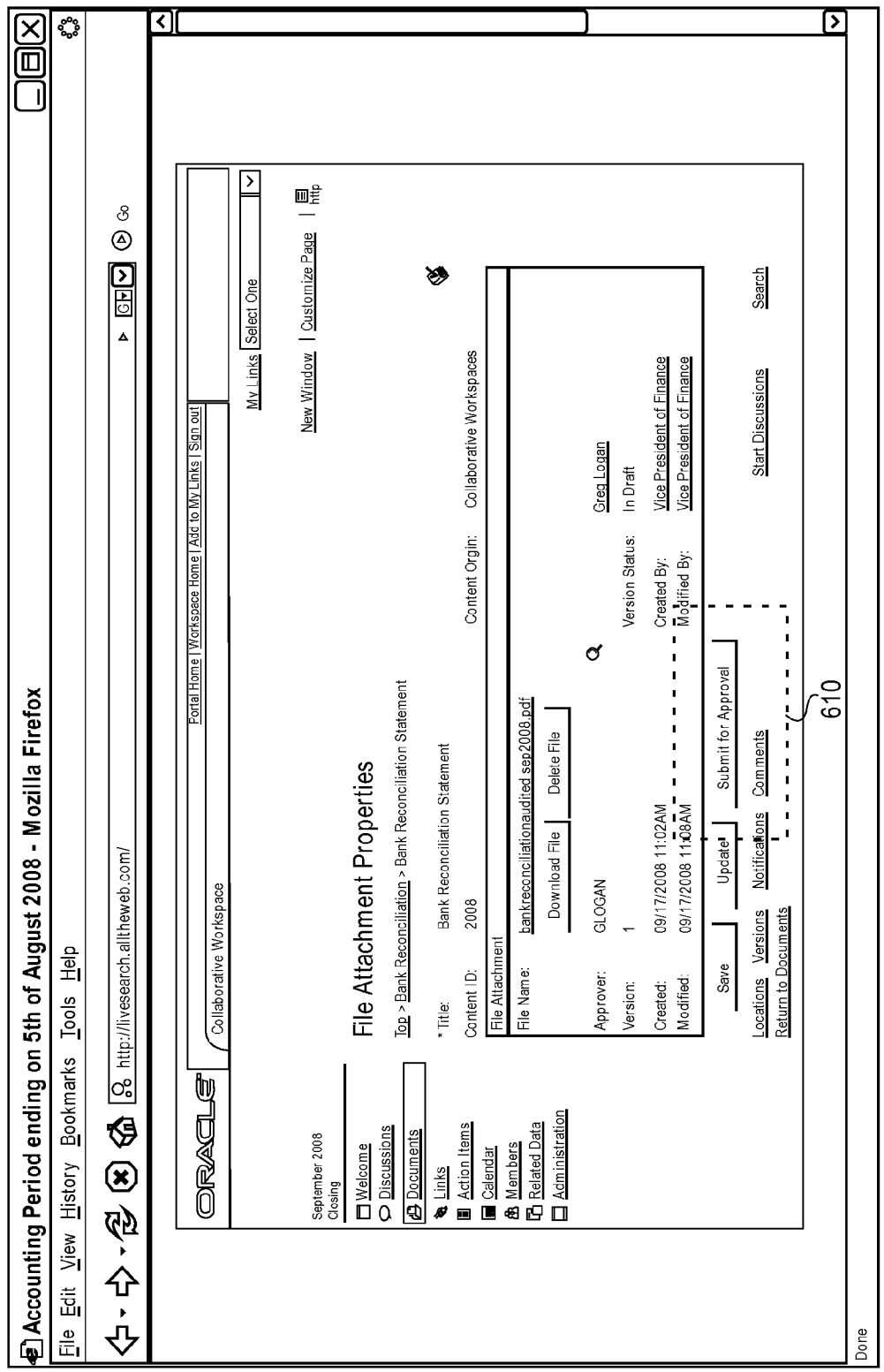
FIG. 6 is an illustration of a user interface that enable a user to manage the approval of a document according to an embodiment of the invention.

As an example of how this may be performed, consider FIG. 6, which is an illustration of a user interface 600 that enables a user to manage the approval of a document according to an embodiment of the invention. User interface 600 enables a user to manage the approval of documents. As shown in FIG. 6, a user may use control 610 to send a notification to collaboration server 120 that the user approves of a particular version of a document. In response, collaboration server 120 will store all related information associated with the approval in a storage medium.

Having described user interfaces and workspaces according to certain embodiments of the invention, additional details will now be discussed about how a user may use and configure a particular workspace.

Pagelets

A pagelet is pluggable user interface component that assists in the performance of activities related to the financial close process. A pagelet may be incorporated as part of a user interface displayed by a client. For example, user interface 220 of FIG. 2 displays pagelets 230, 232, 234, 236, and 238. A pagelet may display data obtained from an external source. For example, while a pagelet may be displayed on user interface 220 of client 220, the data displayed by a particular pagelet may be initially stored at any location accessible to collaboration server 120, such as storage medium 132. Indeed, a pagelet may be configured to retrieve and display data from a variety of different financial systems across an organization, including but not limited to, ERP systems, legacy systems, accounting data stores, and sales data stores. By viewing the various pagelets of a user interface, users can see action items, discussions, calendar events, and other activities related the financial close process. In this way, the user may quickly get idea of the status of the financial close process and what needs to be done to move the financial close process to successful completion.

Pagelets allow a user to perform a variety of different activities and tasks related to the financial close process. While pagelets may be designed to operate in a variety of different manners, to illustrate how certain pagelets operate, an explanation of the pagelets displayed on user interface 220 of FIG. 2 will be provided. Pagelet 230 is a user interface component which enables a user to view upcoming action items related to the financial close process. In addition to the due date for each action item, pagelet 230 also indicates who is assigned responsibility for each action item. If a user clicks on or otherwise selects a particular action item displayed by pagelet 230, then user interface 220 will be updated to display additional details about that action item and may allow the user to perform work on the particular action item (assuming the user has the appropriate access privileges).

Figure 7:
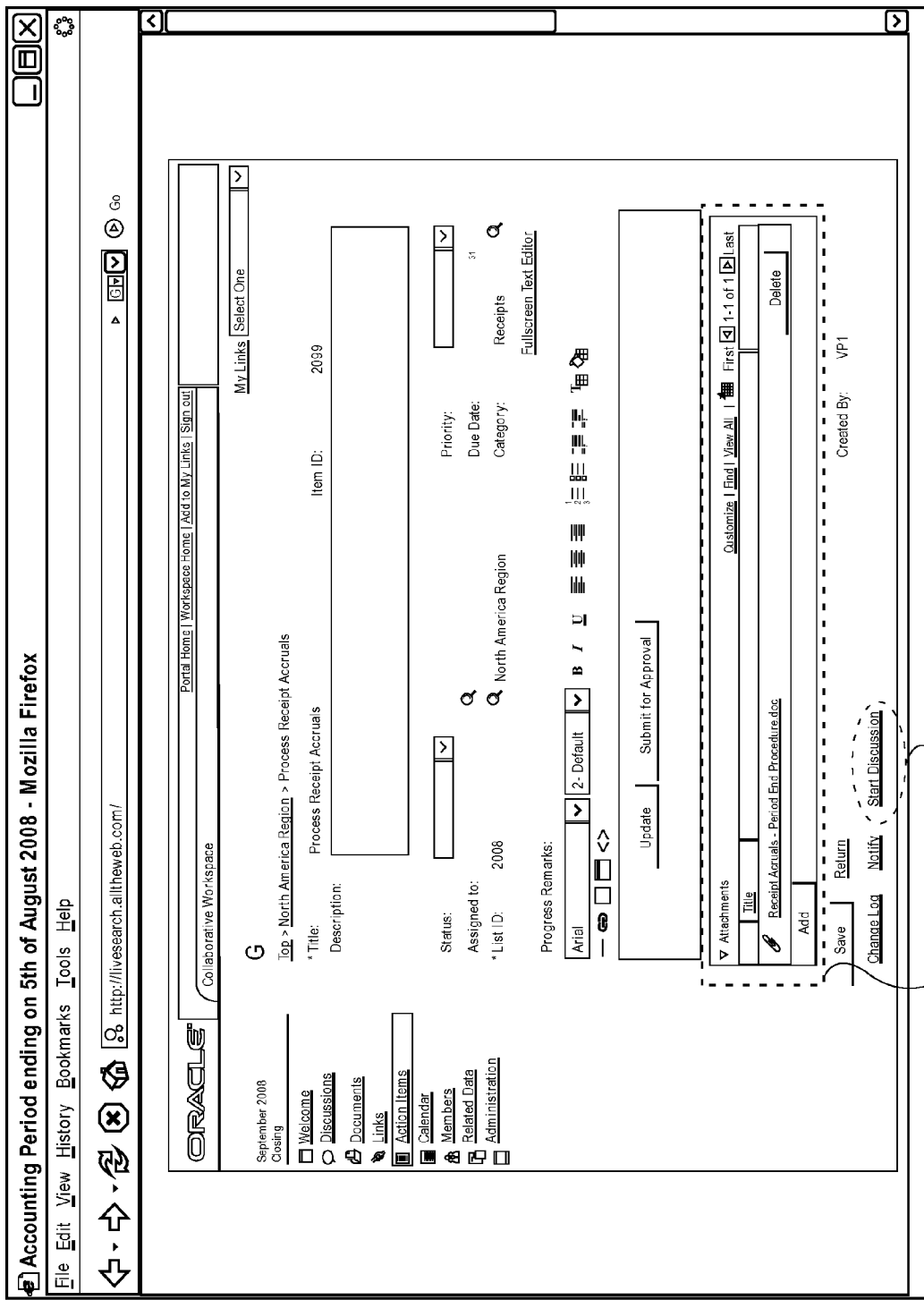
FIG. 7 is an illustration of a user interface that may display additional details about that action item according to an embodiment of the invention.

FIG. 7 is an illustration of a user interface 700 that may display additional details about that action item according to an embodiment of the invention. The additional details which may be stored in association with an action item are not limited to those depicted by user interface 700. For example, each action item may have a start date and a stop date (or due date). User interface 700 depicts area 710 which may be used to attach documents to an action item. Additionally, control 720 may be used to conduct a discussion about an action item. By selecting control 720, another user interface may be presented to a user to enable the user to conduct a discussion about the action item.

Figure 8:
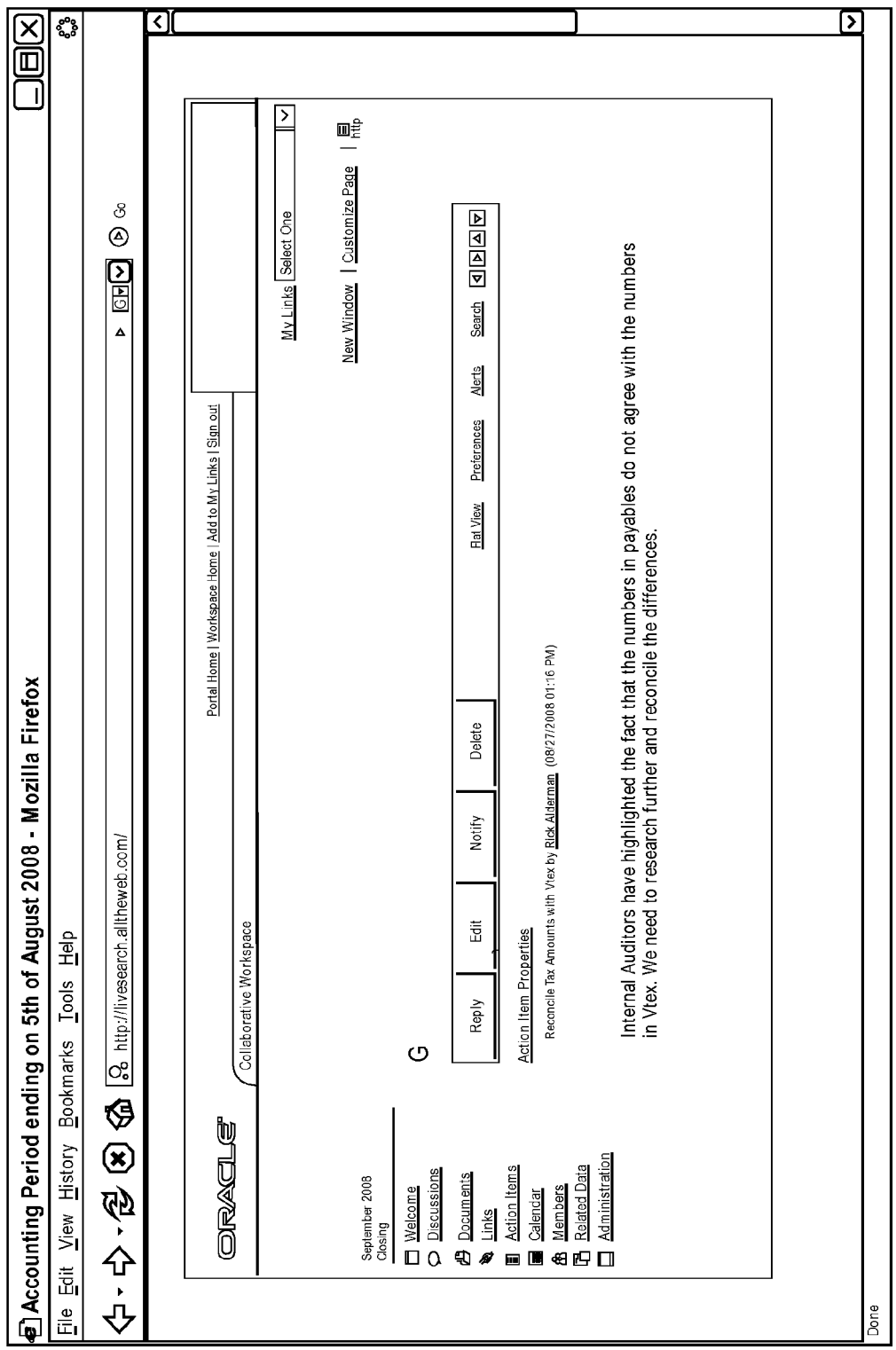
FIG. 8 is an illustration of a user interface that enables a user to conduct a discussion about an action item according to an embodiment of the invention.

FIG. 8 is an illustration of a user interface 800 that enables a user to conduct a discussion about an action item according to an embodiment of the invention. Using user interface 800, a user may start or respond to a discussion pertaining to certain action items. All discussions will be associated with the workspace, and so any user who wishes to search for relevant discussions about a particular financial close process may quickly retrieve information about the discussions at a later point in time.

Pagelet 232 is a user interface component which enables a user to view recent discussions related to the financial close process. Pagelet 232 displays the date of the most recent posting for each discussion as well as the author of the most recent posting for each discussion. In this way, pagelet 232 enables threaded discussion to be conducted and associated with a workspace. If a user clicks on or otherwise selects a particular discussion displayed by pagelet 232, then additional details about that threaded discussion will be displayed. Additionally, pagelet 232 provides a control to enable a use to start a new discussion thread.

Pagelet 234 is a user interface component which enables a user to view upcoming milestones related to the financial close process. Pagelet 234 displays the date of each milestone as well as the person responsible for creating the milestone. If a user clicks on or otherwise selects a particular milestone displayed by pagelet 234, then additional details about that milestone will be displayed. Additionally, pagelet 234 provides a control to enable a user to define a new milestone (assuming the user has the appropriate privileges to do so).

Pagelet 236 is a user interface component which enables a user to view a calendar depicting the dates of activities related to the financial close process. If a user clicks on or otherwise selects a particular date displayed by pagelet 236, then any details about the selected date will be displayed. The details, associated with dates, displayed by pagelet 236 may be automatically generated. In other words, if a milestone having a particular date is defined by pagelet 234, then the milestone will automatically be displayed by pagelet 236 at the appropriate date. Additionally, pagelet 236 provides a control to enable a user to define additional details about a particular date (assuming the user has the appropriate privileges to do so).

Figure 9:
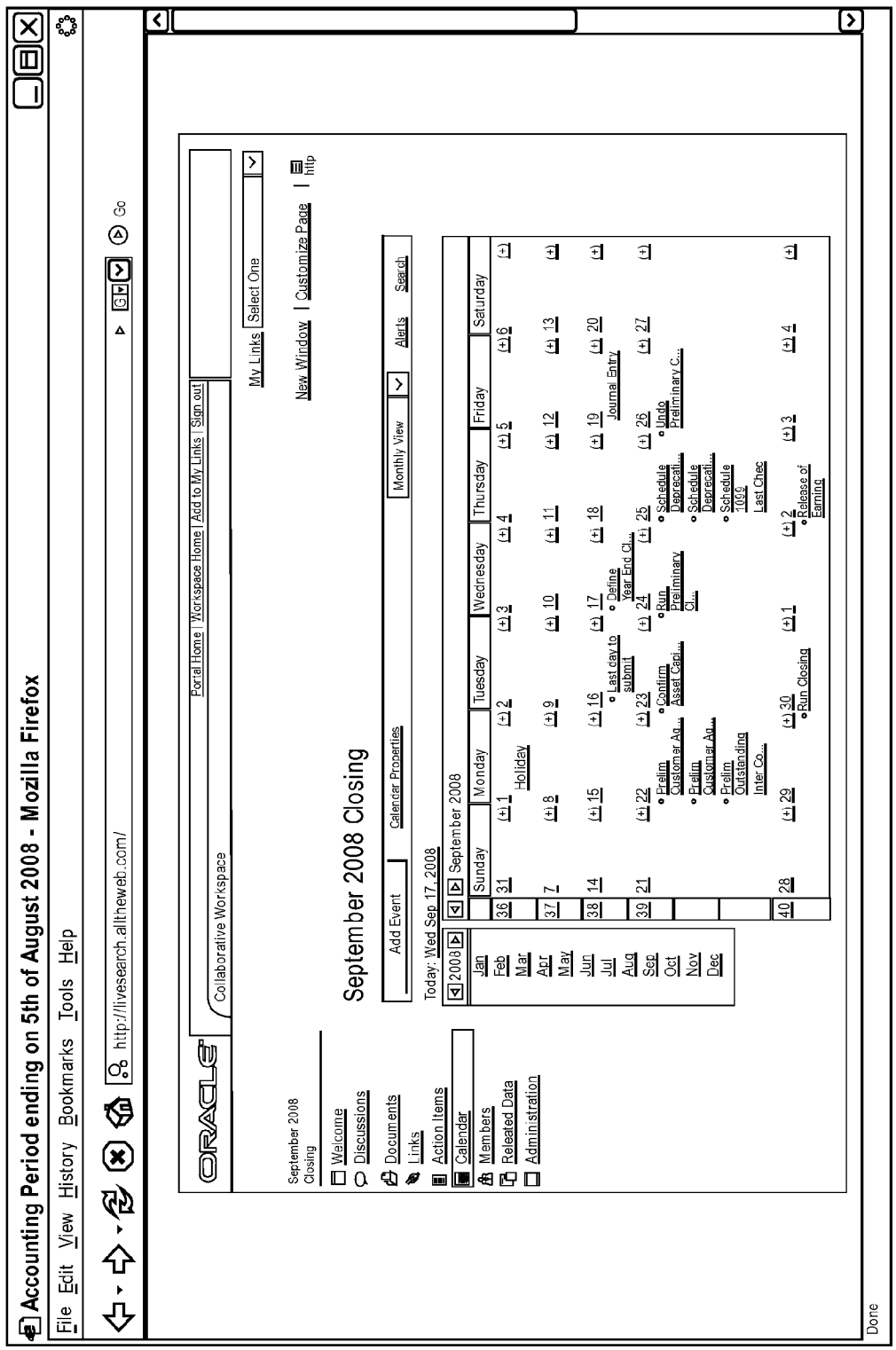
FIG. 9 is an illustration of a user interface depicting a calendar depicting the dates of activities related to the financial close process according to an embodiment of the invention.

Pagelet 236 may display the calendar depicting the date of activities related to the financial close process at different levels of granularity. FIG. 9 is an illustration 900 of a user interface depicting a calendar depicting the dates of activities related to the financial close process according to an embodiment of the invention. The calendar shown in FIG. 9 may be used to depict the dates associated with action items, milestones, events, activities, or tasks associated with a particular financial close process. The calendar may be configured by a user to display more or less detailed information or highlight information that meets certain criteria with a specified color to help highlight the information to the user's attention.

Pagelet 238 is a user interface component which enables a user to view various links related to the financial close process. The links displayed by pagelet 238 may link to useful information and/or documents in performing tasks or activities related to a financial close process. In an embodiment, an administrator may initially determine which links pagelet 238 should display and thereafter a user may subsequently configure pagelet 238 to display a set of links unique for that user.

User interface 220 of FIG. 2 also depicts a toolbar 240. Toolbar 240 may be used to access user interfaces that enable or provide the various functions depicted in toolbar 240. For example, pagelet 236 may be depicted by selecting the "calendar" option of toolbar 240.

Configuring a Workspace by Adding or Removing Pagelets

In an embodiment, different users having access to the same workspace may have a different view of the workspace if they have different roles in the company or organization performing the financial close process. In this way, each person's view of a workspace can be particularly tailored to address his or her own needs in the performance of the financial close process.

Figure 3:
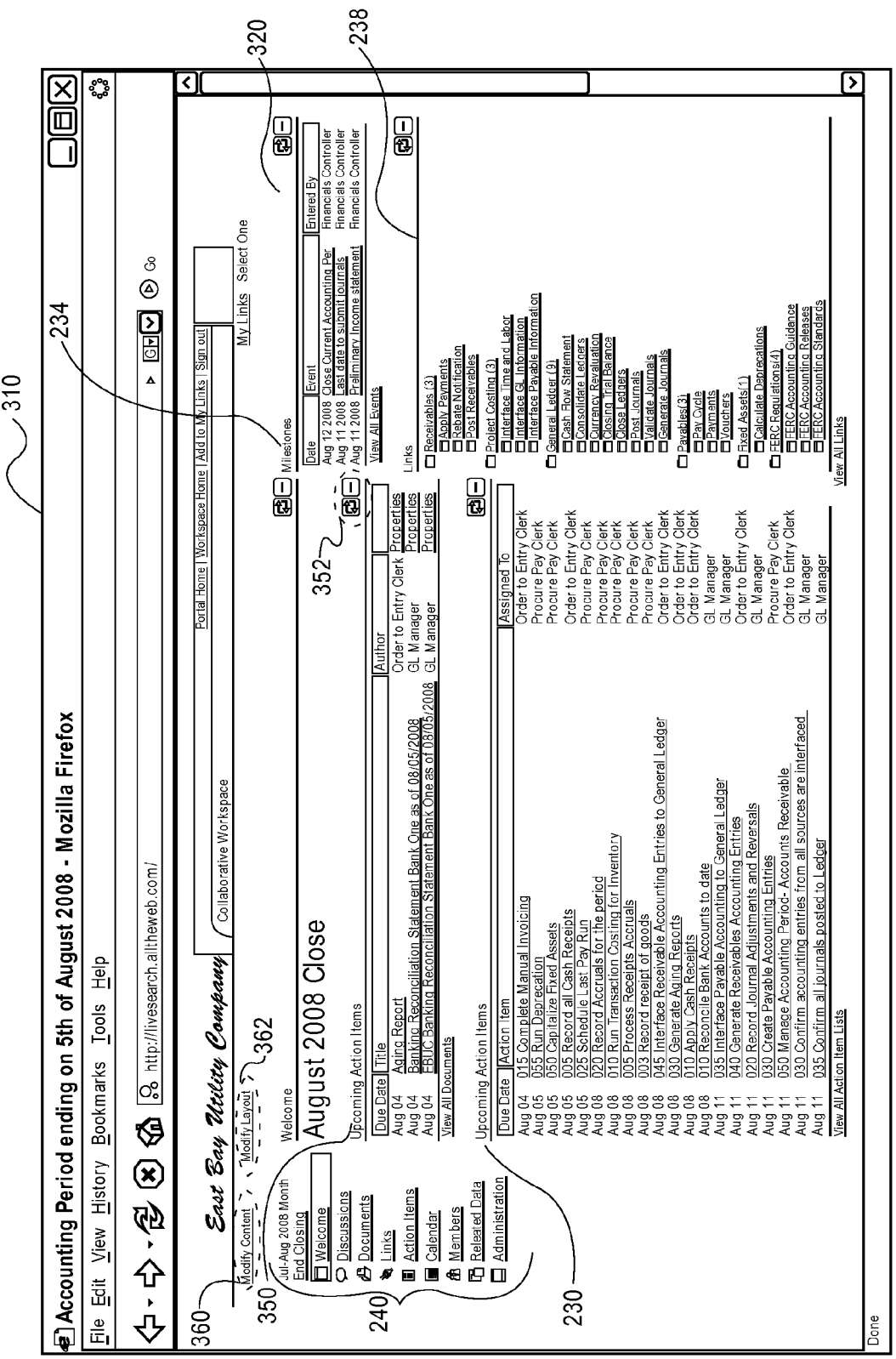
FIG. 3 is an illustration of a user interface displayed by a client used by a Chief Financial Officer (CFO) according to an embodiment of the invention.

To illustrate, consider FIG. 3, which is an illustration 300 of a user interface 310 displayed by a client of a Chief Financial Officer (CFO) according to an embodiment of the invention. User interface 310 is similar to that of user interface 220 of FIG. 2, as both FIG. 2 and FIG. 3 depict user interfaces associated with the same workspace, namely the workspace for the August 2008 close of the fictitious East Bay Utility Company. However, user interface 220 of FIG. 2 depicts the workspace from the perspective of a General Ledger Account (GLA), while user interface 310 of FIG. 3 depicts the workspace from the perspective of the CFO.

The pagelets depicted on the user interface shown in FIGS. 2 and 3 are largely the same, although user interface 220 of FIG. 2 depicts pagelet 236 while user interface 310 of FIG. 3 does not, and user interface 310 of FIG. 3 depicts pagelet 350, while user interface 220 of FIG. 2 does not. Pagelet 350 is a user interface component which depicts recently accessed documents. In addition to the recently accessed documents, pagelet 350 also displays the date in which documents were last accessed, the author of the documents, and properties associated with the documents.

As shown above, a user may add or remove a pagelet from their view of a workspace. When a user adds or removes a pagelet from their view of a workspace, the view which other users have of the workspace is not changed. In other words, if the CFO changes the pagelets associated with the workspace depicted by user interface 310 of FIG. 3, then the user interface 220 of FIG. 2 would not be affected, since user interface 220 is associated with a different user.

A user interface may provide a variety of different mechanisms for adding a pagelet to or removing a pagelet from a view of a workspace. For example, control 352, associated with pagelet 350, may be configured by a user to remove or change the properties associated with pagelet 350. Additionally, pagelets may be added or removed from user interface 310 by a user selecting control 360. Also, the layout of the pagelets on user interface 310 may be adjusted by the user selecting control 362. These controls are merely illustrative, as various embodiments of the invention may employ different approaches for enabling a user to add or remove a pagelet from his or her view of a workspace.

In an embodiment of the invention, a user may add a pagelet that displays data, from an external data source, in a customized format. As shall be explained below in the section entitled "Single Sign-on", a pagelet may display data from an external data source (such as a legacy system, ERP, or other financial system) in this manner without requiring the user to sign on or authenticate themselves to the external data source.

Role Based Permission

Embodiments of the invention may employ a variety of different approaches to enforce permissions in system 100. In an embodiment, by a user is allowed to perform an action, a check is made to determine whether the user has been granted sufficient permission to perform the action using system 100, as ensuring the confidence of the financial data associated with the financial close process is vital. For example, it may not be appropriate for everyone involved in performing a financial close process to have access to sensitive data, such as employee salary information. Thus, embodiments of the invention may require that users have a sufficient permission level to perform actions in system 100, such as viewing certain information in a pagelet or signing an electronic document as part of an approval process.

In an embodiment, users who have been granted access to a workspace may be granted access by virtue of a role. To illustrate, a user may be granted access to a workspace as an author, a contributor, an administrator, or a viewer. Each of these roles may have a different set of read or write access privileges. An administrator may be granted read and write access to all data associated with a workspace. A viewer may be granted only read access, but no write access, to data associated with a workspace. A contributor may be granted a limited write access privilege to write data related to certain functions pertaining to his or her job, but may not write data pertaining to other functions not associated with his or her job. An author may be granted a similar set of privileges, but more limited in scope, as an administrator. These roles are merely exemplary, as other embodiments of the invention may employ a different set of roles and/or may associate different access privileges with each role.

Health Check

In an embodiment of the invention, a pagelet may be configured to provide a "health check" for some activity or task related to a financial close process. In this context, a "health check" is a pagelet that provides a visual indicator of the status of a certain activity or task related to a financial close process. Health checks are useful in that they quickly provide they viewer with an understanding of how the financial close process is progressing. Also, as shall be explained below, a health check provides the user with the ability to help resolve any problems in the activity or task associated with the health check.

In an embodiment, additional details may be obtained by a user about the activity or task associated with the health check by selecting an activity or task displayed in the health check. After selecting an activity or task in the health check, additional details about the activity or task, such as information, documents, related links, and a list of actions items or subtasks associated with the selected activity or task may be displayed. Alternately or additionally, after selecting an activity or task in the health check, a user interface may be presented which enables the user to perform work on the selected activity or task, such as approving a document or responding to an electronic message. In this way, the user can drill down to learn additional details about an activity or task and may act upon those additional details.

In an embodiment, a health check may display a particular color in association with a particular activity or task. The particular color shown in association with the activity or task indicates how well the activity or task is progressing. For example, if the color green is shown, then activity or task may be progressing well, if the color yellow is shown, the activity or task may be slightly behind schedule, and if the color red is shown, then activity or task may be significantly behind schedule. The health check may be configured, by a user, to change what criteria the health check uses to determine whether an activity or task should be displayed in association with a particular color.

In another embodiment, the particular color chosen to display in association with a particular activity or task may be selected to indicate when the particular activity or task is due. For example, activities or tasks which are due more than one month from the current date may be displayed in association with the color green, activities or tasks which are due one month or less from the current date may be displayed in association with the color yellow, and activities or tasks which are overdue may be displayed in association with the color red. In this embodiment, the health check may be configured, by a user, to change the time periods which the health check uses to determine whether an activity or task should be displayed in association with a particular color.

In an embodiment, a health check may also display what percent of an activity or task is completed. Embodiments of the invention may compute the percent completed using various approaches. According to one approach, a determination is made as to how many total units of work comprise the activity or task relative to how many units of work of the activity or task have actually been performed. According to another approach, the percent completed for a particular activity or task may be supplied by a user responsible for performing the particular activity or task.

In an embodiment, if a particular activity or task is composed of a set of subtasks, then the percent completed for the particular activity or task is determined to be the lowest percent complete of any of the set of subtasks. In this way, a particular activity or task is viewed as being only as strong as the weakest link in the chain.

Embodiments of the invention may employ a variety of different approaches to proactively notify a user about status information managed by a health check. In an embodiment, an email, instant message, or other electronic message may be sent by collaboration server 120 to a user of system 100. The electronic message may identify all activities or tasks assigned to the user. Such an electronic message may be sent to the user(s) responsible on a scheduled basis or anytime when a particular activity or task is overdue or otherwise needs attention or action. In this way, a user may be notified if there is a problem with any of the activities or tasks for which he or she is responsible.

In an embodiment, the electronic message sent from collaboration server 120 to a responsible user may contain a link. If the user were to click or otherwise select the link, then the user may cause a client to display a user interface that depicts the user's view of the workspace associated with the electronic message. In this way, one can quickly access their view of the workspace with a click of a button and view the health check to obtain the additional details about the current status of the activity or task being monitored by the health check.

In an embodiment, while a particular activity or task may be assigned responsibility to a first user, one or more subtasks of that the particular activity or task may be assigned to a different user. Thus, by drilling down on an activity or task displayed by a health check, not only may additional detailed status information be presented to the user, but additional information about how to contact the party responsible for each subtask may also be presented. In this way, if a user discovers that a particular action item is behind schedule or otherwise needs attention, the user may discover which person is responsible for the action item and may discover how to contact that responsible person.

In an embodiment, a visual indicator may be displayed in association with contact information for a user. The visual indicator indicates whether the user associated with the visual indicator is online or not. In another embodiment, multiple visual indicators may be displayed in association with contact information for a user, and each of the multiple visual indicators may indicate whether the user is currently accessible by a particular mode of communication, such as instant message, phone, paging, etc. In this way, if an action item is time sensitive, a user may quickly determine whether a responsible party is reachable by a particular mode of communication. For example, a visual indicator may indicate that a person is not reachable by a particular mode of communication (for example, a telephone call) because of the time of day where the person is located (for example, he could be located in another time zone where it is after business hours or the person may be on vacation).

In an embodiment, by selecting the visual indicator, a user may initiate a telephone call, an email composition window, or instant message to the person associated with the visual indicator. If the responsible party is not reachable, then additional contact information may be displayed for the responsible party's manager or other responsible contact person, so that if an action item needs attention immediately, a reachable person may be found to quickly address the issue.

Single Sign-on

In an embodiment, a user of system 100 need only authenticate themselves to system 100 once. After a user has been authenticated, collaboration server 120 stores information about the user's authentication credentials in a storage medium, such as storage medium 130. A user may authenticate themselves to system 100 by presenting a username/password combination, biometric information, digital certificate, or other such authentication criteria. System 100 may employ an authentication server (not depicted in FIG. 1) to assist with the authentication of users.

System 100 enables a user to access a large number of storage mediums, ERP systems, and repositories of digital information using a pagelet. Some of the storage mediums, ERP systems, and repositories of digital information accessible by system 100 may require their own set of authentication credentials separate and distinct from the authentication credentials required by system 100 to log onto system 100.

Rather than requiring the user to log in multiple times each time the user wishes to access a storage medium, ERP system, or repositories of digital information which requires an additional username/password or other such authentication credential, collaboration server 120 may use the user's authentication credentials to look up or otherwise obtain any additional authentication credentials to uniquely identify the user to an external source, such as a storage medium, an ERP system, or a repository of digital information, which requires the authentication credentials. After obtaining the additional authentication credentials, collaboration server 120 may send the additional authentication credentials to the external source requiring the additional authentication credentials to obtain data for display to the user in a pagelet.

Advantageously, such an approach enables pagelets to obtain data from a plurality of sources without requiring the user to sign in more than once. Thus, the user may, in a pagelet, view data from sources as diverse as news and current events and regulatory authorities to legacy ERP systems and other business financial systems without requiring the user to present authentication credentials more than once. As a result, the user has a more pleasant, convenient, and efficient experience using system 100.

Implementing Mechanisms

Figure 11:
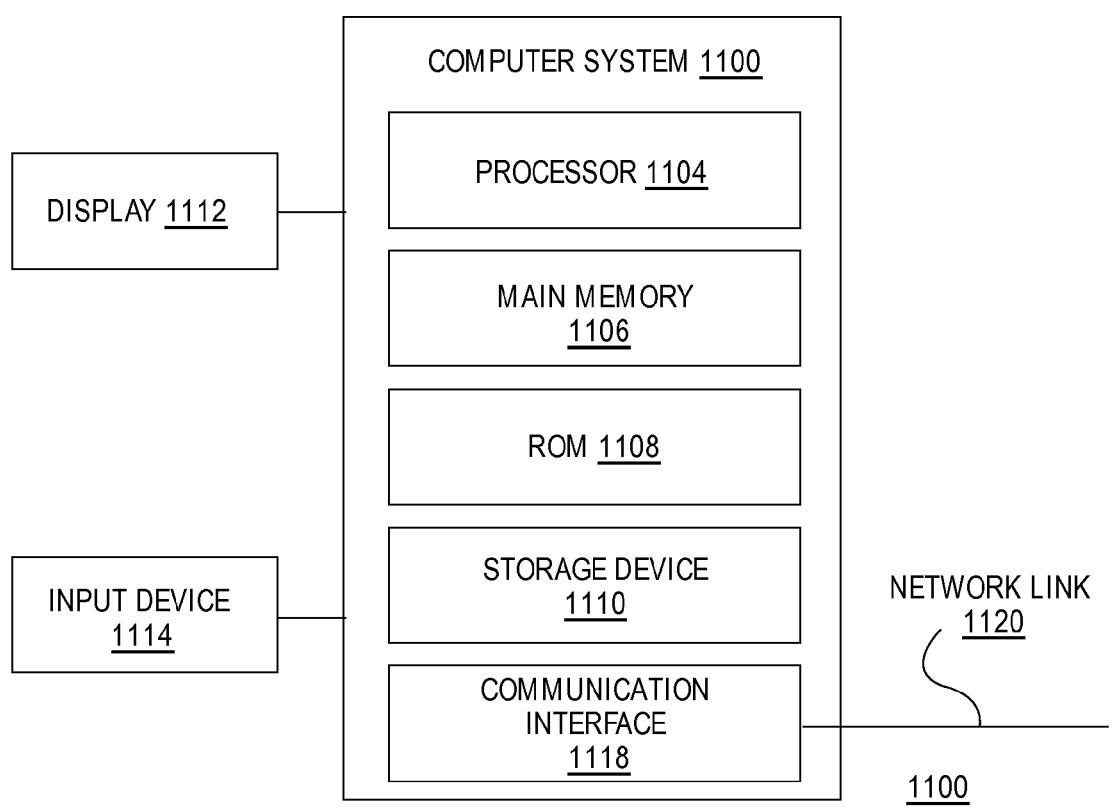
FIG. 11 is a block diagram that illustrates a computer system upon which an embodiment of the invention may be implemented.

In an embodiment, one or more of clients 110 and 112, collaboration server 120, and storage mediums 130 and 132 may each be implemented using a computer system. FIG. 11 is a block diagram that illustrates a computer system 1100 upon which an embodiment of the invention may be implemented. In an embodiment, computer system 1100 includes processor 1104, main memory 1106, ROM 1108, storage device 1110, and communication interface 11518. Computer system 1100 includes at least one processor 1104 for processing information. Computer system 1100 also includes a main memory 1106, such as a random access memory (RAM) or other dynamic storage device, for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device for storing static information and instructions for processor 1104. A storage device 1110, such as a magnetic disk or optical disk, is provided for storing information and instructions.

Computer system 1100 may be coupled to a display 1112, such as a cathode ray tube (CRT), a LCD monitor, and a television set, for displaying information to a user. An input device 1114, including alphanumeric and other keys, is coupled to computer system 1100 for communicating information and command selections to processor 1104. Other non-limiting, illustrative examples of input device 1114 include a mouse, a trackball, or cursor direction keys for communicating direction information and command selections to processor 1104 and for controlling cursor movement on display 1112. While only one input device 1114 is depicted in FIG. 11, embodiments of the invention may include any number of input devices 1114 coupled to computer system 1100.

Embodiments of the invention are related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 1104 for execution. Such a medium may take many forms, including but not limited to, non-volatile media and volatile media. Non-volatile media includes, for example, optical or magnetic disks, such as storage device 1110. Volatile media includes dynamic memory, such as main memory 1106.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a network link 1120 to computer system 1100.

Communication interface 1118 provides a two-way data communication coupling to a network link 1120 that is connected to a local network. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through a local network to a host computer or to data equipment operated by an Internet Service Provider (ISP).

Computer system 1100 can send messages and receive data, including program code, through the network(s), network link 1120 and communication interface 1118. For example, a server might transmit a requested code for an application program through the Internet, a local ISP, a local network, subsequently to communication interface 1118. The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions, which when executed by a processor, cause:
   sending, to a client, first display data, which when rendered by the client, depicts a collaborative financial close portal, wherein the collaborative financial close portal supports a plurality of workspaces used by a set of users to perform activities related to a financial close process, and wherein the plurality workspaces are arranged in a hierarchical relationship; and
   in response to receiving identification data that identifies a user of the client, sending, to the client, second display data, which when rendered by the client, depicts a particular workspace, of the plurality of workspaces;
   wherein in the particular workspace, multiple users including the user are granted access to financial data associated with the financial close process;
   wherein the depiction of the particular workspace includes a depiction of status information about a particular financial close activity, said particular financial close activity comprising a set of financial close activities associated with a set of workspaces lower in the hierarchal relationship than the particular workspace;
   wherein the status information about the particular financial close activity depicts a particular state in a sequence of possible states, the particular state corresponding to a least successful status associated with any financial close activity in said set of financial close activities;
   wherein the financial close process is performed on the particular workspace subsequent to performance of the financial close process on said set of workspaces; and
   wherein the financial close process of each workspace covers a specific period of time.

2. The one or more machine-readable storage mediums of claim 1, wherein the instructions, on execution by the processor, enable a user to configure the particular workspace to include one or more pagelets, wherein each of the one or more pagelets are pluggable user interface components that assist in the performance of the financial close activities, wherein each of the one or more pagelets display data obtained from an external source, and wherein each of the one or more pagelets comprise links to documents related to the financial close activities.

3. The one or more machine-readable storage mediums of claim 2, wherein the particular workspace includes a particular pagelet, of the one or more pagelets, that depicts information describing the status of the particular financial close activity, and wherein work is being performed on the particular financial close activity by users having membership in at least one workspace, of the plurality workspaces, other than the particular workspace.

4. The one or more machine-readable storage mediums of claim 1 wherein an outcome of the particular financial close activity depends upon outcomes of financial close processes associated with the set of workspaces, wherein the information is depicted in association with a displayed color, wherein the displayed color is associated with said particular state and the least successful status is determined to be the lowest percent complete.

5. The one or more machine-readable storage mediums of claim 1, wherein the identification data is first identification data, and wherein execution of the one or more sequences of instructions further causes:
   using the first identification data to look up second identification data, wherein the second identification data uniquely identifies the user to an external source requiring the second identification data; and
   sending the second identification data to said external source to obtain data for display in a particular pagelet of the one or more pagelets without requiring the user to sign in more than once.

6. The one or more machine-readable storage mediums of claim 1, wherein the particular workspace enables the user to (a) track tasks by assigning responsibility of a particular task to a particular user having access to the particular workspace, (b) monitor progress of the particular task, (c) conduct threaded discussions on action items relating to the financial close activities, (d) share documents with other users having access to the particular workspace, and (e) maintain version control of the documents shared with other users having access to the particular workspace.

7. The one or more machine-readable storage mediums of claim 1, wherein execution of the one or more sequences of instructions further causes:
   in response to receiving a request to create a new workspace, creating the new workspace having attributes of a template identified by the request.

8. The one or more machine-readable storage mediums of claim 1, wherein execution of the one or more sequences of instructions further causes:
   storing, in a persistent storage medium, approval data that identifies, for each document associated with the particular workspace that has been signed, (a) an identity of any user which signed the document, (b) a version of the document signed, and (c) a date each user signed the document; and
   maintaining the approval data in the persistent storage medium after the conclusion of the financial close process.

9. The one or more machine-readable storage mediums of claim 1, wherein execution of the one or more sequences of instructions further causes:
   in response to receiving input that selects a particular action item that is indicated to be overdue, sending, to the client, third display data which, when rendered by the client, displays a user interface component which enables the user to contact, by telephone, email, or instance message, another user assigned responsibility for the particular action item.

10. The one or more machine-readable storage mediums of claim 1, wherein the hierarchical relationship in which the plurality of workspaces are arranged is a tree, and wherein each level of the tree corresponds to a different organizational level of an organization.

11. A machine-implemented method for enabling a client to perform activities related to a financial close process, comprising:
    rendering by the client, a collaborative financial close portal, wherein the collaborative financial close portal supports a plurality of workspaces used by a set of users to perform a set of financial close activities related to a financial close process, and wherein the plurality of workspaces are arranged in a hierarchical relationship;
    the client transmitting first identification data that identifies a user of the client;
    rendering by the client, a particular workspace, of the plurality of workspaces, for which the user is granted access, and wherein the depiction of the particular workspace includes a depiction of status information about financial close activities associated with a set of workspaces lower in the hierarchal relationship than the particular workspace;
    using the first identification data to look up second identification data, wherein the second identification data uniquely identifies the user to an external source requiring the second identification data; and
    sending the second identification data to said external source to obtain data for display by the client without requiring the user to sign in more than once;
    wherein the financial close process is performed on the particular workspace subsequent to performance of the financial close process on said set of workspaces; and
    wherein the financial close process of each workspace covers a specific period of time.

12. The machine-implemented method of claim 11, wherein the client enables the user to configure the particular workspace to include one or more pagelets, wherein each of the one or more pagelets are pluggable user interface components that assist in the performance of the financial close activities, and wherein each of the one or more pagelets display data obtained from an external source.

13. The machine-implemented method of claim 12, wherein the particular workspace includes a particular pagelet, of the one or more pagelets, that depicts information describing a status of a particular financial close activity, and wherein work is being performed on the particular financial close activity by users having membership in at least one workspace, of the plurality of workspaces, other than the particular workspace.

14. The machine-implemented method of claim 11, wherein an outcome of a particular financial close activity depends upon outcomes of processes associated with the set of workspaces, wherein the information is depicted in association with a displayed color, wherein the displayed color is associated with a particular state of a sequence of possible states, and wherein the machine-implemented method further comprises:
    selecting the particular state, associated with the particular financial close activity, to correspond to a least successful status associated with any of the processes.

15. The machine-implemented method of claim 11, wherein the particular workspace enables the user to (a) track tasks by assigning responsibility of a particular task to a particular user having access to the particular workspace, (b) monitor progress of the particular task, (c) conduct threaded discussions on action items relating to the financial close activities, (d) share documents with other users having access to the particular workspace, and (e) maintain version control of the documents shared with other users having access to the particular workspace.

16. The machine-implemented method of claim 11, wherein the machine-implemented method further comprises:
    in response to receiving a request to create a new workspace, creating the new workspace having attributes of a template identified by the request.

17. The machine-implemented method of claim 11, wherein the machine-implemented method further comprises:
    storing, in a persistent storage medium, approval data that identifies, for each document associated with the particular workspace that has been signed, (a) the identify of any user which signed the document, (b) the version of the document signed, and (c) the date each user signed the document; and
    maintaining the approval data in the persistent storage medium after the conclusion of the financial close process.

18. The machine-implemented method of claim 11, wherein the machine-implemented method further comprises:
    in response to receiving input that selects a particular action item that is indicated to be overdue, sending, to the client, third display data which, when rendered by the client, displays a user interface component which enables the user to contact, by telephone, email, or instance message, another user assigned responsibility for the particular action item.

19. The machine-implemented method of claim 11, wherein the hierarchical relationship in which the plurality of workspaces are arranged is a tree, and wherein each level of the tree corresponds to a different organizational level of an organization.

20. An apparatus for enabling a client to perform activities related to a financial close process, comprising:
    a processor;
    a non-transitory machine-readable medium electronically coupled to the processor, the non-transitory machine-readable medium storing one or more sequences of instructions, which when executed by at least the processor, cause:
    sending, to the client, first display data, which when rendered by the client, depicts a collaborative financial close portal, wherein the collaborative financial close portal supports a plurality of workspaces used by a set of users to perform the activities related to a financial close process, and
    wherein the plurality workspaces are arranged in a hierarchical relationship; and
    in response to receiving first identification data that identifies a user of the client, sending, to the client, second display data, which when rendered by the client, depicts a particular workspace, of the plurality of workspaces, for which the user is granted access, and wherein the depiction of the particular workspace includes a depiction of status information about activities associated with a set of workspaces lower in the hierarchal relationship than the particular workspace;
    using the first identification data to look up second identification data, wherein the second identification data uniquely identifies the user to an external source requiring the second identification data; and sending the second identification data to said external source to obtain data for display by the client without requiring the user to sign in more than once;

wherein the financial close process is performed on the particular workspace subsequent to performance of the financial close process on said set of workspaces; and wherein the financial close process of each workspace covers a specific period of time.

21. The one or more machine-readable storage mediums of claim 1, wherein execution of the one or more sequences of instructions further causes:

in response to receiving input that selects a particular action item that is indicated to be overdue, sending, to the client, third display data which, when rendered by the client, displays a user interface component which enables the user to contact, by telephone, email, or instance message, a first person assigned responsibility for the particular action item and display additional contact information for a second person to be contacted if the particular action item needs attention immediately and the first person is not reachable.

* * * * *

UNITED STATES PATENT AND TRADEMARK OFFICE
CERTIFICATE OF CORRECTION

PATENT NO. : 8,296,200 B2  Page 1 of 1
APPLICATION NO. : 12/470419
DATED : October 23, 2012
INVENTOR(S) : Mangipudi et al.

It is certified that error appears in the above-identified patent and that said Letters Patent is hereby corrected as shown below:

On page 2, in column 2, under "Other Publications", line 31, delete "avaiiable" and insert -- available --, therefor.

In column 7, line 41, delete "identify" and insert -- identity --, therefor.

In column 15, line 31, in Claim 1, delete "plurality" and insert -- plurality of --, therefor.

In column 16, line 5, in Claim 3, delete "plurality" and insert -- plurality of --, therefor.

In column 18, line 16, in Claim 17, delete "identify" and insert -- identity --, therefor.

In column 18, line 53, in Claim 20, delete "plurality" and insert -- plurality of --, therefor.

Signed and Sealed this
Twenty-fifth Day of December, 2012

David J. Kappos
*Director of the United States Patent and Trademark Office*